United States Patent Office 3,660,445
Patented May 2, 1972

3,660,445
NICKEL π-ALLYL HALOGENOACETATES
Francois Dawans, Bougival, France, assignor to Institut Francais du Petrole des Carburants et Lubrifiants, Rueil Malmaison, Hauts-de-Seine, France
No Drawing. Filed Aug. 19, 1968, Ser. No. 753,769
Claims priority, application France, Aug. 23, 1967, 118,816
Int. Cl. C07f 15/04
U.S. Cl. 260—439 R                7 Claims

ABSTRACT OF THE DISCLOSURE

The present disclosure is directed to nickel π-allyl halogenoacetates complying with the general formula:

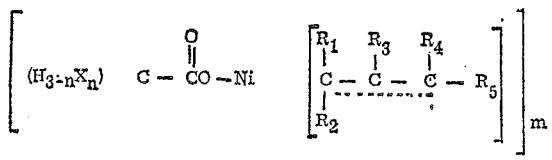

wherein X is a halogen, $n$ an integer from 1 to 3, $R_1$, $R_2$, $R_3$, $R_4$ and $R_5$, are selected from the group consisting of hydrogen, allyl, cycloalkyl, aralkyl and aryl, or at least two of $R_1$, $R_2$, $R_3$ and $R_4$ are part of a cycle, and $m$ is an integer equal to 1 or 2. The compounds of the present disclosure are effective as catalysts in the polymerization of unsaturated organic compounds.

This invention relates to the preparation and use of a new catalytic system providing for the conversion of monomeric compounds with ethylenic bonds to polymers of high molecular weight. More particularly this process is convenient for conversion of butadiene to a polymer whose mircostructure essentially exhibits cis1,4-linkages, in most cases for at least 95% of the constitutive units, and whose intrinsic viscosity, measured in toluene, at 30° C., may be higher than 1 dl./g.

It is known that the compounds of the transition metals of the X—Me— π-allyl type, wherein Me is a transition metal from the 4th to 8th sub-groups of the periodical classification of elements, and X is a halogen, are catalysts for polymerization of olefins or diolefins but, in most cases, they require the combined use of additives such as Lewis' acids or bases so as to produce, with satisfactory activity and selectivity for industrial use, stereoregular polymers of high molecular weight.

It has now been discovered that nickel-π-allyl halogenoacetates derivatives exhibit, unexpectedly, a catalytic activity in polymerization, whereby can be obtained, in the absence of any additive and even under atmospheric pressure and at a temperature close to the ambient temperature, highly stereoregular polymers and more particularly cis-1,4 polybutadiene exhibiting a series of properties which make them of advantageous use in the field of synthetic elastomers.

The catalysts according to this invention comply with the general formula:

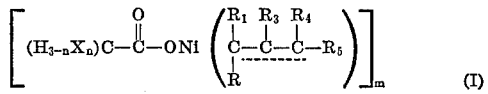

wherein X represents a halogen, preferably fluorine, $n$ being an integer selected from the values 1, 2 and 3 preferably equal to 3; $R_1$, $R_2$, $R_3$, $R_4$ and $R_5$, which may be identical to or different from each other, represent a hydrogen or alkyl, cycloalkyl, aralkyl or aryl radicals, the groups or radicals $R_1$, $R_2$, $R_4$ and $R_5$, being optionally combined at least by two in a cyclic system, preferably comprising from 5 to 12 terms, $m$ being an integer preferably equal to 1 or 2.

These compounds offer numerous advantages: they are easily produced according to the process of this invention, they have a good stability in time to the ambient temperature under inert atmosphere, which makes easier their storage and handling. Moreover they exhibit a high activity and selectivity in the process of polymerizing conjugated diolefins; specially in the case of butadiene they give rise to high polymers with high contents in cis-1,4 units, free from gel and whose molecular weights are distributed within a narrow range.

The nickel π-allyl halogenoacetate derivatives object of this invention, may be easily prepared by reacting allyl esters of halogenoacetic acids with carbonyl or olefinic derivatives of nickel. Reactants may be used in proportions either stoichiometrical or not. The stoichiometry corresponds to 1 nickel atom (in the form of nickel derivative) per molecule of ester.

The allyl halogenoacetates as used comply with the general Formula II:

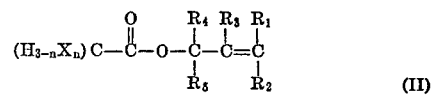

wherein X, $R_1$, $R_2$, $R_3$, $R_4$ and $R_5$ have the same meaning as above.

As allylic esters, there can be used, for example, allyl trifluoroacetate, crotyl difluoroacetate, methallyl monofluoroacetate, allyl trichloroacetate, allyl dichloroacetate, allyl difluoro - monochloroacetate, cinnamyl trifluoroacetate, 1-octenyl 3-trifluoroacetate, 2-octenyl 4-trifluoroacetate, pinenyl-trichloroacetate etc.

There can be used, for instance, the following nickel derivatives: nickel tetracarbonyl, nickel bis-cyclopentadiene, nickel bis(1,5-cyclooctadiene), 1,5,9 centro-nickel trans, trans, trans cyclododecatriene, nickel bis (3,7 dimethyl-1,5 cyclooctadiene), nickel cyclooctatetraene, nickel tris-bicycloheptane, nickel bis-duroquinone etc.

The reaction according to this invention may be carried out either in the presence of an inert solvent, or without any solvent when the allyl ester is liquid, As solvents, there can be used ethers or saturated, aromatic or halogenated aromatic hydrocarbons.

The reaction is advantageously conducted at temperature of from −40° C. to +120° C. and preferably within the range of from −20° C. to +60° C. The process must be carried out in the absence of air, i.e. under an inert gas atmosphere, for instance argon, since the prepared compounds are sensitive to the action of air. The process according to the invention results in the direct obtainment with a substantially quantitative yield, of pure products which can be used for initiating the stereospecific polymerization of compounds having ethylenic bonds without requiring any purification treatment.

The polymerizable monomers according to this invention, added as such or as mixtures, are compounds with ethylenic bonds and more particularly conjugated diolefins, preferably linear and containing from 4 to 7 carbon atoms; there are for instance to be mentioned: isoprene, piperylene, dimethylbutadiene and more particularly butadiene.

The proportion of catalyst, which may be extremely low, is chosen in consideration of the desired polymerization rate and molecular weight of the polymer. In most cases, there will be used at least 0.001 nickel atom (in the form of a complex thereof) and preferably from 0.1 to 2 nickel atoms per 100 moles of the monomer. These preferred proportions are those for which there is obtained a polymer exhibiting the best properties as synthetic elastomer. The solvents optionally used in the polymerization reaction are advantageously selected from the group of the inert hydrocarbons, particularly paraffinic or cycloparaffinic hydrocarbons and their halogenated derivatives, more particularly their chlorinated derivatives. However there are preferred non-polar solvents such as paraffinic or cycloparaffinic hydrocarbons, which provide for a higher selectivity in cis-1,4 units, whereas the polar solvents favour the formation of trans-1,4 units.

As examples of solvents preferably used for the formation of polybutadienes with a high content of cis-1,4 units, are to be mentioned pentane, hexane, n-heptane, octane, isoheptane, iso-octane, cyclohexane and methylcyclohexane.

The polymerization reaction may be carried out at a pressure sufficient to maintain the reaction mixture substantially in the liquid phase. The pressure depends on the particular diluent optionally used and on the temperature at which polymerization is achieved, which temperature can be comprised between −40° C. and +120° C. and preferably bewteen 0 and +30° C.

The process according to the invention can be carried out either as a continous or as a batch process, by introducing the olefin(s) into a reactor containing the initiator and the diluent.

According to another embodiment of the invention, the catalytic species can be preformed by reacting the nickel compound with the allyl ester into the polymerization reactor and thereafter, without separating the resulting reaction product, the polymerization can be effected by adding the monomer.

It is however preferable first to eliminate the solvent when the same is an aromatic hydrocarbon and it is desired to obtain highly cis-1,4 polymers.

According to a second embodiment, there is admixed in any order the nickel derivative, the allylic ester and the monomer and polymerization is effected. In such a case it is preferred not to use a solvent of the aromatic type (aromatic hydrocarbon for instance) in order to obtain highly cis-1,4 polymers.

When the polymerization is complete, in the case of a batch process, the total reaction mixture is subjected to a treatment for deactivating the catalyst and recovering the polymer.

Any convenient process may be used for this treatment of the reaction mixture.

According to one of said processes the polymer is recovered by distillation with steam of the diluent. In another convenient process there is added to the mixture a substance which deactivates the catalyst and precipitates the polymer, such as an alcohol. The polymer is thereafter separated from the precipitant and the diluent by means of any suitable method such as decantation or filtration. It is often preferred to add initially just the amount of substance which is necessary to deactivate the catalyst without causing the polymer to precipitate.

It has also been observed that it is advantageous to add an antioxidant agent, for example N-phenyl β-naphthylamine or ditertiobutyl-paracresol to the solution of polymer, prior to recovering the latter. After addition of the substance for deactivating the catalyst and of the anti-oxydant agent, the polymer contained in the solution may be separated by adding an excess of a substance such as ethyl or isopropyl alcohol.

Besides, it is advantageous to add to the alcohol, during the precipitation of the polymer, a complexing agent for the metals of the catalytic system, such as acetylacetone or the disodium salt of tetracetic ethylene-diamino acid, which results in the easy obtainment of a polymer free from any metal residue.

It must be understood that other suitable means for recovering the polymer from the solution can be used according to the present invention. After having separated the polymer from the alcohol and the diluent by means of a filtration and other convenient operations, the polymer is dried.

The polymers obtained according to the invention are generally in a solid state, although there can be obtained a wide range of molecular weights from the liquid to the solid state. Besides, the cis-1,4 polybutadienes obtained according to the invention exhibit a series of properties (high molecular weights of narrow dispersion, low gel content, high unsaturation) which make them convenient for use as synthetic rubber.

The microstructure of the polybutadienes has been determined by infra-red spectrophotometry according to the method of D. Morero, A. Santambrogio, L. Porri and F. Ciampelli (La Chimica e l'Industria XLI–8–1959).

The following non-limitative examples are illustrative of different embodiments of the invention, examples 4A and 9A are given by way of comparison only and are no part of the invention.

EXAMPLE 1

To a solution of 27.5 g. of nickel bis-cyclooctadiene in 100 cc. of toluene, is added, under argon atmosphere, while stirring at 0° C., a solution of 30 g. of allyl trifluoroacetate in 100 cc. of toluene. After 1 hour of reaction at 0° C., the reaction mixture is evaporated under reduced pressure until obtainment of a dry solid. This residual solid is washed twice with 20 cc. of benzene and then dried under vacuum at the ambient temperature. There are obtained 18 g. of a yellow coloured powder stable at the ambient temperature under argon atmosphere for several weeks.

The elementary analysis of this powder shows the respective contents of 28.1% of carbon, 2.3% of hydrogen, 27.2% of nickel, 26.7% of fluorine and 15.7% of oxygen, which corresponds to the raw formula

$C_3H_5NiOOCCF_3$ (theoretical composition: 28.3% of carbon, 2.3% of hydrogen, 27.3% of nickel, 27% of fluorine and 15.1% of oxygen).

EXAMPLE 1A 130 g. of butadiene are added to the reaction product according to Example 1. After stirring at 55° C. for 2 hours, there are obtained 60 g. of polybutadiene of the following structure: 95% of cis-1,4 units, 4% of trans-1,4 units and 1% of 1,2 units and whose intrinsic viscosity, measured at 30° C. in toluene, is equal to 0.85 dl./g.

EXAMPLE 1B

When, in Example 1A, polymerization is conducted at 0° C. for 15 hours, everything else being unchanged, there are obtained 85 g. of polybutadiene having a 97% content of cis-1,4 units and a 3% content of trans-1,4 units, and exhibiting an intrinsic viscosity equal to 2.4 dl./g. Determinations of the molecular mass by weight ($M_p$) by light diffusion and of the molecular mass by number ($M_n$) by osmometry permit to find the ratio $M_p/M_n = 2.58$.

EXAMPLE 1C 52 g. of butadiene and 100 cc. of normal heptane are added to 1.5 g. of the reaction product according to Example 1. After stirring at 0° C. for 24 hours there are obtained 40 g. of polybutadiene whose micro-structure is composed of 96% of cis-1,4 units, 3% of trans-1,4 units and 1% of vinyl units.

EXAMPLE 1D 182 g. of butadiene and 200 cc. of normal heptane are added to 1.5 g. of the reaction product according to Example 1. After stirring at 20° C. for 24 hours, there are obtained 165 g. of cis-1,4 polybutadiene having an intrinsic viscosity of 2 dl./g.

EXAMPLE 1E 61 g. of isoprene are added to 1.5 g. of the reaction product according to Example 1. After stirring at 55° C. for 24 hours, there are obtained 15 g. of polyisoprene essentially composed of 1,4 units.

EXAMPLE 2

A solution of 15 g. of allyl trifluoroacetate into 100 cc. of normal heptane is added dropwise, at −10° C. to a suspension of 27.5 g. of nickel bis-cyclooctadiene into 100 cc. of normal heptane. After stirring for 2 hours at 0° C. the so-formed precipitate is filtered, washed with normal heptane and dried under vacuum at the ambient temperature. There are thus obtained 24 g. of a powder whose elementary analysis corresponds to the formula $$C_3H_5NiOOCCF_3$$

and exhibiting the same catalytic properties for stereospecific polymerization as those of the product according to Example 1.

EXAMPLE 3

15 g. of allyl trifluoroacetate are added to a solution of 20 g. of nickel tetracarbonyl into 100 cc. of benzene. After stirring at 50° C. for 3 hours, the reaction mixture is evaporated under reduced pressure until obtainment of a dry solid. The residue, after washing with benzene and drying under vacuum, finally gives 6 g. of a powder having a catalytic activity similar to that of Example 1.

EXAMPLE 4

To a suspension of 14 g. of nickel bis-cyclooctadiene into 100 cc. of diethyl ether, is added, at −20° C., a solution of 7.7 g. of allyl trifluoroacetate into 100 cc. of diethyl ether. After stirring at 0° C. for one hour, the reaction solution is concentrated under reduced pressure and then cooled down to −70° C. There can be separated, by filtration, 8.8 g. of powder. When, to 1.5 g. of said powder, are added 52 g. of butadiene and 200 cc. of iso-octane, there are obtained, after stirring for 5 hours at 30° C., 44 g. of polybutadiene containing more than 98% of cis-1,4 units and whose intrinsic viscosity of 30° C. in toluene is equal to 2.6 dl./g.

EXAMPLE 4A

By way of comparison Example 4 is repeated except that allyl trifluoroacetate has been replaced by allyl chloride in the same proportion. There are recovered 8 g. of solid compound, unstable at the ordinary temperature. Polymerization of butadiene under the same conditions as described in Example 4 is carried out with this compound and, after 80 hours of reaction at 30° C., there are obtained 3 g. of polybutadiene, containing 89% of cis-1,4 units, 7% of trans-1,4 units and 4% of 1,2 units and exhibiting an intrinsic viscosity, measured at 30° C. in toluene, equal to 0.32 dl./g.

EXAMPLE 5

At −20° C. there are added 20 cc. of a solution of 15 g. of allyl trifluoroacetate per liter of normal heptane, to 0.5 g. of nickel bis-cyclooctadiene. After stirring for 30 minutes, the reaction mixture is evaporated under reduced pressure at ambient temperature until obtainment of a dry solid residue to which are thereafter added 20 cc. of normal heptane and 10.4 g. of butadiene. After stirring for 3 hours at the ambient temperature, there are obtained 8 g. of polybutadiene containing 94% of cis-1,4 units, 5% of trans-1,4 units and 1% of 1,2 units.

EXAMPLE 6

To 0.5 g. of nickel bis-cyclooctaiene are added 20 cc. of a solution of 15 g. of allyl trifluoroacetate per liter of normal heptane and 10.4 g. of butadiene. After stirring for 20 hours at the ambient temperature, there are obtained 2.5 g. of polybutadiene, containing 86% of cis-1,4-units, 12% of trans-1,4 units and 2% of 1,2-units.

EXAMPLE 7

The mixture of a solution of 19 g. of nickel bis-cyclopentadiene into 100 cc. of toluene with a solution of 15.5 g. of allyl trifluoroacetate into 100 cc. of toluene is stirred for 3 hours at 60° C. The reaction mixture is then evaporated under reduced pressure until obtainment of a dry solid which is washed twice with 20 cc. of benzene and dried under vacuum at the ambient temperature.

To 1.5 g. of the reaction product are added 52 g. of butadiene and 100 cc. of normal heptane. After stirring at 55° C. for 24 hours, there are obtained 34 g. of polybutadiene containing 98% of cis-1,4- units, 1% of trans-1,4- units and 1% of vinyl units.

EXAMPLE 8

To a suspension of 27.5 g. of nickel bis-cyclooctadiene into 100 cc. of toluene, is added, at −20° C., a solution of 41 g. of allyl trichloroacetate into 100 cc. of toluene. The mixture is stirred at 0° C. for 2 hours and then evaporated under reduced pressure at the ambient temperature, until obtainment of a dry solid.

To 1.5 g. of the reaction product are added 52 g. of butadiene and 100 cc. of normal heptane and the mixture is stirred at 0° C. for 20 hours.

There are thus obtained 28 g. of polybutadiene containing 96% of cis-1,4 units, 3.5% of trans-1,4 units and 0.5% of 1,2 units.

EXAMPLES 9–12

To a suspension of 14 g. of nickel bis-cyclooctadiene into 100 cc. of normal heptane are added, according to each example, under stirring at 0° C., such an amount of allyl ester that the molar ratio (nickel derivative/ester) be equal to 0.7. The temperature is thereafter allowed to raise up to 20° C. and, after stirring for 1 hour, the supernatant phase is decanted and the residual solid is washed successively 4 times with 50 cc. of normal heptane and thereafter, dried under reduced pressure up to maintenance of a constant weight.

The so-obtained π-allyl nickel halogenoacetate derivatives have been used for polymerizing butadiene under the following conditions:

solvent used: normal heptane
butadiene concentration in heptane: 5.3 moles per liter
concentration of the π-allyl nickel halogenoacetate in the reaction medium expressed in gram-atoms of nickel per liter: $2.2.10^{-2}$
polymerization temperature: 30°C.
duration of the polymerization: 5 hours.

The results obtained for each syntheses of π-allyl nickel halogenoacetate derivative and for each polymerization are summarized in the following table:

| Ex. | Ester used as reactant | Conversion rate to nickel π-allyl acetate or halogeno acetate, percent | Conversion rate to cis-1,4 polybutadiene, percent | Intrinsic viscosity measured at 30° C. in solution in toluene, dl./g |
|---|---|---|---|---|
| 9 | $C_3H_5OOCCH_2Cl$ | 90 | 3 | 0.44 |
| 9A | $C_3H_5OOCCH_3$ | 80 | 0 | ---- |
| 10 | $C_3H_5OOCCHCl_2$ | 92 | 19 | 0.89 |
| 11 | $C_3H_5OOCCCl_3$ | 92 | 40 | 2.04 |
| 12 | $C_3H_5OOCCF_3$ | 95 | 97 | 3.32 |

According to the following examples, for which the same operating conditions as in Examples 1 to 9 were used, has been carried out the syntheses of catalysts whose properties are similar to those of the previously manufactured catalysts. The following reactants have been used.

EXAMPLE 13

1,5,9-centro-nickel trans, trans, trans cyclododecatrien +allyl difluoroacetate

EXAMPLE 14

Nickel bis-cyclooctadiene+allyl monofluoro, dichloroacetate.

EXAMPLE 15

Nickel cyclooctatetraene+allyl dichloroacetate.

EXAMPLE 16

Nickel bis (3,7 dimethyl 1,5-cyclooctadiene)+methallyl monofluoroacetate.

EXAMPLE 17

Nickel bis-duroquinone+pinenyl trichloroacetate.

What is claimed as this invention is:

1. A process for manufacturing nickel π-allyl halogenoacetates which consists of reacting allyl halogenoacetates of the general formula:

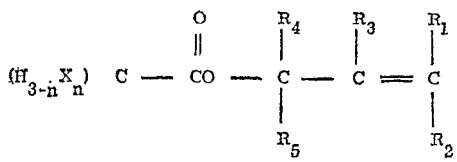

wherein X is a halogen; $n$ is an integer from 1 to 3; $R_1$, $R_2$, $R_3$, $R_4$, and $R_5$ are selected from the group consisting of hydrogen, alkyl, cycloalkyl, aralkyl, and aryl, the resulting allyl group containing from 3 to 9 carbon atoms; or at least two of $R_1$, $R_2$, $R_4$, and $R_5$ are combined in a cyclic system containing from 5 to 12 carbon atoms with nickel carbonyl or nickel olefinic complexes at a temperature of from −40 to 120° C.

2. The process of claim 1 wherein the reaction is conducted at a temperature of between −20° C. and +60° C.

3. The process of claim 1 wherein the allyl halogenoacetate is selected from the group consisting of allyl trifluoroacetate, crotyl difluoroacetate methallyl monofluoroacetate, allyl trichloroacetate, allyl dichloroacetate, allyl difluoro-monochloroacetate, cinnamyl trifluoroacetate, 1-octenyl 3-trifluoroacetate, 2-octenyl 4-trifluoroacetate and pinenyl trichloroacetate.

4. The process of claim 1 wherein the nickel complex is selected from the group consisting of nickel tetracarbonyl, nickel biscyclopentadiene, nickel bis (1,5-cyclooctadiene, 1,5,9- centro-nickel trans, trans, trans-cyclododecatriene, nickel bis (3,7-dimethyl-1,5 cyclooctadiene), nickel cyclooctatetraene, nickel tris-bicycloheptene and nickel bis-duroquinone.

5. The process of claim 1 wherein the allyl halogenoacetates are reacted with nickel carbonyl or nickel olefinic complexes in an inert gas atmosphere.

6. The process of claim 1 wherein the nickel π-allyl halogenoacetate is produced by reacting 1,5,9-centro-nickel-trans, trans, trans cyclododecatriene and allyl difluoroacetate.

7. The process of claim 1 wherein the nickel π-allyl-halogenoacetate is produced by reacting nickel bis-cyclooctadiene and allyl monofluoro, dichloroacetate.

References Cited

UNITED STATES PATENTS

| 3,338,936 | 8/1967 | Heck | 260—439 |
| 3,384,650 | 5/1968 | Heck | 260—439 |
| 3,424,777 | 1/1969 | Wilke | 260—439 |
| 3,468,866 | 9/1969 | Alferov et al. | 260—94.3 |

OTHER REFERENCES

Robinson et al. J. Organometal Chem. 3 (1965) p. 367–70.

TOBIAS E. LEVOW, Primary Examiner

A. P. DEMERS, Assistant Examiner

U.S. Cl. X.R.

252—431 C; 260—94.3, 429 L